United States Patent [19]

Charnock

[11] 4,451,615

[45] May 29, 1984

[54] POLYISOPRENE TOUGHENED ADHESIVE COMPOSITION

[75] Inventor: Ronald S. Charnock, Castletown, Ireland

[73] Assignee: Loctite (Ireland) Limited, Tallaght, Ireland

[21] Appl. No.: 473,984

[22] Filed: Mar. 16, 1983

Related U.S. Application Data

[63] Continuation of Ser. No. 262,654, Apr. 11, 1981, abandoned.

[30] Foreign Application Priority Data

May 9, 1980 [IE] Ireland ................................. 964/80
Jul. 11, 1980 [IE] Ireland ................................. 1449/80

[51] Int. Cl.$^3$ .......................................... C08F 279/02
[52] U.S. Cl. ........................................ 525/98; 525/293; 525/305; 525/310; 156/332; 156/334
[58] Field of Search ............... 525/301, 303, 305, 310, 525/98, 99

[56] References Cited

U.S. PATENT DOCUMENTS

| | | | |
|---|---|---|---|
| 3,300,547 | 1/1967 | Gorman | 260/885 |
| 3,757,828 | 9/1973 | Frauenglass | 525/305 |
| 4,138,449 | 2/1979 | Baldwin | 260/879 |
| 4,155,950 | 5/1979 | Wolinski | 260/859 |
| 4,181,635 | 1/1980 | Takamatsu | 525/92 |
| 4,287,317 | 9/1981 | Kitagawa | 525/309 |

Primary Examiner—Paul R. Michl
Attorney, Agent, or Firm—Walter J. Steinkraus; Eugene F. Miller

[57] ABSTRACT

A structurally toughened heat resistant adhesive composition comprising a solution of polyisoprene elastomer in polymerizable acrylate ester monomers. The adhesive composition also contains an adhesion promoter, a cross-linking agent, a free-radical generator and a free-radical accelerator. The adhesive compositions are generally used as two-part systems, and yield bonds with improved heat and solvent resistant properties. The polymerizable acrylate ester monomers may be monofunctional or a combination of mono- and polyfunctional monomers. Among the useful classes of monomers are alkyl and cycloalkyl acrylates, alkyl and cycloalkyl methacrylates, alkoxy acrylates and methacrylates, alkylene diacrylates and dimethacrylates. A few of the preferred monomers are methyl methacrylate, lauryl methacrylate, isobornyl methacrylate, and tetrahydrofurfuryl methacrylate. The preferred polyisoprene rubbers are generally copolymers (or block copolymers) of (i) isoprene with styrene, acrylonitrile, or methacrylonitrile; (ii) homopolymers of polyisoprene; or (iii) copolymers of either (i) or (ii) with a functional monomer; or (iv) mixtures of the above. Most preferred are the homopolymers of isoprene.

16 Claims, No Drawings

POLYISOPRENE TOUGHENED ADHESIVE COMPOSITION

CROSS REFERENCE TO RELATED APPLICATION

This application is a continuation of Ser. No. 262,654, filed May 11, 1981, now abandoned.

BACKGROUND OF THE INVENTION

Disclosed in the prior art are adhesive compositions based on solutions of elastomeric polymers in polymerizable vinyl monomers. The compositions usually exhibit reasonably good storage stability and cure rapidly to strong, tough bonds. The compositions cure in the presence of air at room temperature, usually with the aid of various polymerization catalysts; e.g., free-radical generators, initiators, promoters, and accelerators.

Examples of such adhesive compositions can be found in U.S. Pat. Nos. 3,810,407, 3,962,372, 4,112,013, 4,118,436, 3,994,764, 3,832,274, and 4,138,449. Adhesive compositions formulated from these patents have several shortcomings which make them ineffective in applications which involve extreme environmental conditions.

One major disadvantage is their inability to maintain their structural properties such as tensile shear strength, T-peel and impact after significant exposure to high temperature aging. The chlorosulfonated polyethylene, polychloroprene and polyurethane rubber based adhesive compositions are limited, with respect to their maximum useful service, to temperatures less than 110° C. All of these adhesives require the addition of reasonably large amounts of epoxy resins to improve high temperature resistance. However, high temperature improvements in this manner are not always substantial enough to meet the requirements of many high temperature applications, and often are merely temporary.

A particular disadvantage of the poly(butadiene) based adhesive compositions is that they are soluble in relatively few monomers. Recent legislation regarding hazardous organic solvents has focused on the need to replace high volatile monomers with low volatility, high boiling-point monomers. The prior art rubbers (elastomers) are generally not sufficiently soluble in low volatility methyl methacrylate monomers to allow a useful product to be formulated.

It is evident that there is a need for an adhesive composition which when cured, provides excellent bond strengths and exhibits toughness and resistance to environmental conditions, particularly high temperature, for extended periods of time.

The adhesive compositions of this invention are designed to overcome these traditional problems of the prior art.

SUMMARY OF THE INVENTION

This invention relates to fast curing, free-radical catalyzed structural adhesives, which form bonds of high tensile shear strength and high T-peel strength when cured. The adhesives described herein are generally formulated as two-part adhesives, the first part comprising at least one polymerizable acrylate ester monomer, and at least one isoprene rubber soluble in the monomer, an adhesion promoter, and a free radical initiator system; the second part comprising an activator.

More particularly, this invention relates to two-part adhesive compositions of the polymer-in-monomer type, wherein the polymer is dissolved in the monomer, along with the adhesion promoter and the free radical catalyst system. This solution serves as the first part of the adhesive composition. The second part of the composition is an activator, which is usually applied as a primer or coating to a substrate prior to bonding. The polymer-in-monomer solution can either be applied directly over the activated surface of the substrate or on another substrate to be mated with the first. These adhesive compositions are essentially 100% reactive and do not rely in any way on the loss or evaporation of organic solvents or water to cure.

One advantage of these adhesive compositions is that they exhibit excellent resistance to high temperature heat aging and do not require the addition of large amounts of expensive epoxy resins, as does the prior art. The adhesive compositions retain their high tensile shear strength and high T-peel strengths after exposure to temperatures of up to 180° C. for periods of a week or more. Such improvements are of particular importance in applications which involve high temperature exposure for long period of time; e.g., automobile applications where adhesive bonded car components must withstand paint baking cycles in excess of 150° C. for periods of up to several hours.

Another object of this invention is to provide an ultraviolet curing, toughened adhesive composition which has resistance to sunlight, UV radiation, adverse weather conditions and solvents.

The invention further provides adhesive compositions that upon cure yield bonds which can withstand high impact shock and peeling forces, at room temperature as well as at temperature extremes.

The instant adhesive compositions are fast curing, easy to use compositions which exhibit excellent shelf-life stability, and are capable of bonding a wide variety of substrates. When cured, these compositions provide excellent resistance to temperatures ranging from about −40° C. to about 205° C., oils at elevated temperatures (including sulfur bearing types), moisture and humidity, oxidation and ozonation.

DETAILED DESCRIPTION OF THE INVENTION AND ITS PREFERRED EMBODIMENTS

The polymerizable acrylate ester monomers may be monofunctional or a combination of mono- and polyfunctional monomers. Generally, the monomers are exemplified but not limited to those selected from the class consisting of alkyl acrylates, cycloalkyl acrylates, alkyl methacrylates, cycloalkyl methacrylates, alkoxy acrylates, alkoxy methacrylates, alkylene diacrylates and alkylene dimethacrylates. Among the preferred monofunctional monomers are methyl methacrylate, lauryl methacrylate, 2-ethyl hexyl methacrylate, ethyl methacrylate, n-butyl methacrylate, iso-butyl methacrylate and t-butyl methacrylate. The most preferred are those monomers which have high boiling points and low volatility characteristics, including such monomers as tetrahydrofurfuryl methacrylate, cyclohexyl methacrylate, isobornyl methacrylate, hydroxyethyl methacrylate and hydroxypropyl methacrylate.

The monofunctional monomers mentioned above may generally be represented by the formula:

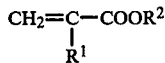   I.

wherein $R^1$ is H, $CH_3$ or lower alkyl, $R^2$ is H, alkyl, alkoxy, cycloalkyl, or alkylene group.

The effective range of the polymerizable acrylate ester monomer to be used in the instant compositions may vary somewhat depending on the specific properties desired, but generally 10–90% by weight of the composition desired, and preferably within the range of 15–80% by weight and most preferably 15–40% by weight. Adjustments within these ranges are easily made within the skill of the art.

It may be desirable to add a polyfunctional monomer to the composition as well. When this is done, it generally should be in the range of about 1–40% by weight, depending on the specific polyfunctional monomer. The preferred polyfunctionals are dimethacrylates of various glycols. These monomers are disclosed in U.S. Pat. No. 3,218,305, and are of the general formula:

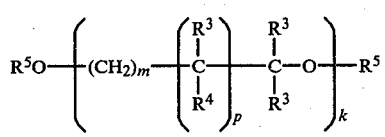   II.

wherein $R^3$ is H, $C_{1-4}$ alkyl or hydroxyalkyl or $R^5OCH_2$—; $R^6$ is H, halogen or $C_{1-4}$ alkyl; $R^4$ is H, OH or $R^5O$—; $R^5$ is $CH_2$=$CR^6C$=O—; m is an integer, preferably 1 to 8; k is an integer, preferably 1 to 20; and p is 0 or 1.

Examples of some preferred glycol dimethacrylates of this formula are polyethylene glycol dimethacrylate and dipropylene glycol dimethacrylate, to name a few.

Other suitable polymerizable acrylate ester monomers which may be employed are described in U.S. Pat. No. 4,018,851, having the general formula:

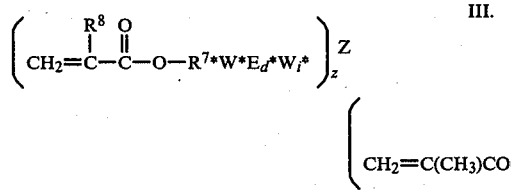   III.

wherein $R^8$ is selected from the class consisting of hydrogen, chlorine, and methyl and ethyl radicals; $R^7$ is a bivalent organic radical selected from the group consisting of lower alkylene of 1–8 carbon atoms, phenylene, and naphthylene; W is a polyisocyanate radical; E is an aromatic, heterocyclic or cycloaliphatic polyol or polyamine radical, preferably a diol, and more preferably a diol of a cycloaliphatic compound; d is either 1 or 0; i is 0 when d is 0, and otherwise equal to one less than the number of reactive hydrogen atoms of E; wherein Z is a (i) polymeric or copolymeric grafted alkylene ether polyol radical or (ii) polymeric or copolymeric methylene ether polyol radical; z is an integer equal to the valency of Z; wherein an asterisk indicates a urethane (—NH—CO—O—) or ureide (—NH—CO—NH—) linkage. Z may also be a polymeric or copolymeric methylene ether polyol radical, giving a group of polymerizable monomers disclosed in U.S. Pat. No. 3,993,815.

Monomers generally characterized as polyurethanes or polyureides, as disclosed in U.S. Pat. No. 3,425,988 may also be used effectively. These monomers are formed from the reaction of an organic polyisocyanate and an acrylate ester having an active hydrogen in the non-acrylate portion of the ester. These monomers may be represented by the general formula:

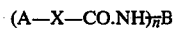   IV.

wherein X is —O— or —$R^9N$—; $R^9$ is selected from a group consisting of H or lower alkyls of 1 through 7 carbon atoms; A is $CH_2$=$CR^{10}$.CO.O—; $R^{10}$ is H or $CH_3$; n is an integer from 2 to 6 inclusive; and B is a polyvalent substituted or unsubstituted alkyl, alkenyl, cycloalkyl, aryl, aralkyl, alkyloxy-alkylene, aryloxy-arylene or heterocyclic radical.

Finally, polymerizable urethane-acrylate monomers disclosed in U.S. patent application Ser. No. 356,679 to O'Sullivan, filed May 2, 1973, now abandoned, particularly Example 3 thereof, may be employed. Typical monomers of this type have the general formula of:

   V.

wherein $R^{11}$ is H, $CH_3$, $C_2H_5$ or $C_1$; $R^{12}$ is $C_{2-20}$ alkylene, alkenylene or cycloalkylene radical or a $C_{6-40}$ arylene, alkarylene, aralkarylene, alkyloxyalkylene or aryloxyarylene radical which may be substituted by 1–4 chlorine atoms or by 1–3 amino or mono- or di-$C_{1-3}$ alkylamino or $C_{1-3}$ alkoxy groups. $R^{13}$ is one of the following less one hydrogen atom: (a) a $C_{1-8}$ hydroxy alkyl or aminoalkyl group, (b) a $C_{1-6}$ alkylamino-$C_{1-8}$ alkyl group; or (c) a hydroxyphenyl, an aminophenyl, a hydroxynaphthyl or an aminonaphthyl group which may be further substituted by an alkyl, alkylamino or dialkylamino group, each alkyl group in this subpart (c) containing up to about 3 carbon atoms. Of these, the preferred compositions contain either monomer VI., of formula:

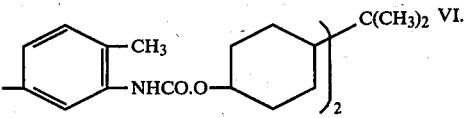   VI.

or monomer VII, of formula:

   VII.

or both, (PR represents a propylene triol oligomer residue).

Mixtures of some or all of the above polymerizable acrylate ester monomers are also helpful.

The polyisoprene rubbers of the instant invention may be selected from a wide range of suitable materials. Most frequently rubbers used are either; (i) homopolymers of natural or synthetic polyisoprene; (ii) random or block copolymers of isoprene with styrene, acrylonitrile or methacrylonitrile; (iii) a copolymer of (i) or (ii)

with a functional monomer selected from the group consisting of acrylic acid, methacrylic acid, maleic anhydride, fumaric acid, itaconic acid, acrylic acid ester and methacrylic acid ester. Also contemplated in the instant invention is a random or block copolymer of synthetic isoprene with a polymerizable acrylate or methacrylate ester monomer.

The preferred rubbers include the homopolymers of natural and synthetic polyisoprenes. Synthetic homopolymers of polyisoprene that have been found particularly useful are marketed by Shell Chemicals under the tradename Cariflex IR-305, and by Goodyear under the tradename Natsyn 2200. One grade of naturally occurring polyisoprene rubber is obtainable from the Malaysian Rubber Producers under the trade name SMR-5L. Natural polyisprene is found in rubber producing trees such as the species Hevea Brasiliensis.

Another preferred polyisoprene rubber is the copolymer of isoprene and acrylonitrile. This rubber is sold by Polysar International S.A. under the trade name Krynac 833.

The rubbers of the instant invention are generally present in the adhesive composition in the amount of about 5 to about 80% by weight, and preferably about 5 to 40% by weight. The average molecular weight of the rubber preferably should not be less than 5000, with an upper limit not greater than a value compatible with the solubility in the chosen monomer.

The choice of the polyisoprene rubber will, to a large degree, dictate various properties and characteristics of the adhesive composition and such choices are easily determined through general experimentation and known methods within the art. It is preferred, however, that the rubbers of the instant invention have a glass transition temperature not exceeding 15° C. In the case of a block copolymer, the glass transition temperature of the various block portions may be different. In the case of isoprene-styrene block copolymers, for example, styrene block has a glass transition temperature of −100° C. and the isoprene block which has a glass transition temperature of −72° C. This demonstrates a gradation of glass transition with the block copolymer is present.

The adhesion promoters of this invention may be chosen from any of those commonly known to the person reasonably skilled in the art. Two types of promoters are preferred. The first type consists of mono- and dicarboxylic acids which are capable of copolymerizing with the acrylate ester monomer. The preferred species of these classes are methacrylic and acrylic acid. Such acids are used in proportions of 1–20% by weight of the composition, preferably in proportion of 1–15%. The second preferred type of adhesion promoter is of the well-known silane type, present in the composition in proportions of 1–10% by weight of the composition.

The free-radical initiator system consists of a free-radical initiator and an accelerator of free radical polymerization, both of which serve to effect rapid polymerization. The free-radical initiators may be of the organic peroxy or hydroperoxy type, perester or peracid type. Especially useful are the perester and peroxide type, among which t-butyl perbenzoate and cumene hydroperoxide are preferred.

Useful initiators include those that can be decomposed by the action of heat or UV light to produce free radicals. They also include other redox polymerization catalysts or any compound capable of generating free radicals. Such compounds can easily be selected from those skilled in the art. For a more detailed discussion, see U.S. Pat. Nos. 3,043,820, 3,591,438, 3,616,640, and 3,832,274.

Those free-radical initiators of the photoinitiator type are preferably selected from the group consisting of acetophenones, benzophenones and 1- and 2-acetonaphthones. Additional initiators may be selected from the class consisting of (a) $C_1$ to $C_6$ alkyl diones; (b) metal carbonyls of the formula $M_x(CO)_y$ wherein M is a metal atom, x is 1 or 2, and y is an integer determined by the total valence of the metal atoms; and (c) carbonyl compounds of the general formula $R^{14}(CO)R^{15}$ wherein $R^{14}$ is an alkyl, aryl, aralkyl or alkaryl group containing up to about 10 carbon atoms, and $R^{15}$ is $R^{14}$ or hydrogen; or $R^{14}$ and $R^{15}$ taken together with carbonyl group form an aromatic or heterocyclic ketone containing up to about 16 carbon atoms.

The initiators are usually employed in amounts of about 1% to about 10% by weight of the composition.

The accelerators of free-radical polymerization of the above-mentioned catalyst system are generally used with good results in concentrations of less than 10% by weight, the preferred range being about 0.1% to about 0.75%. Sulfimides are the preferred group of free-radical accelerators, with the preferred species being 3-oxo-2, 3-dihydrobenz[d]isothiazole-1,1-dioxide, commonly known as benzoic sulfimide or saccharin. Tertiary amines may also be employed as accelerators for free-radical production with the preferred amine being N,N-dimethylparatoluidine.

The final essential ingredient in the instant adhesive composition is an activator, which generally comprises the second part of the adhesive composition, the first part being the curable portion of the composition. These activators are intended to be applied on the surface of a substrate to be bonded, usually as a coating or a primer prior to application of the first part of the adhesive composition. However, it is also feasible for the curable portion of the composition to be put on a substrate and the activator applied over it. The preferred activators are generally aldehyde-amine condensation products, the preferred being butyraldehyde-aniline. Activators of the type are sold commercially by Uniroyal under the name Beutene, or by DuPont under the name DuPont 808. The condensation products are usually in a solvent solution such as trichloroethane, or similar solvents, for easy application.

In another embodiment, a two-part composition is contemplated wherein each part has a polymerizable portion of the adhesive composition, and wherein one part contains the free-radical initiator and the accelerator of free-radical polymerization, and the other part contains the activator.

It is optional, but recommended, that chelators, cross-linking agents, and inhibitors be present in the adhesive composition for optimum performance. Chelators and inhibitors are effective in amounts of about 0.1 to about 1% by weight of the composition. Ethylenediamine tetra-acetic acid, 2,2-ethylenebis-nitril methylidyne dipyridine and the class of Beta-diketones are generally the most effective and are preferred. Cross-linking agents, optionally present in amounts from about zero to about 10% by weight of the composition, include such compounds as copolymerizable dimethacrylates.

The inhibitor concentration left over in the monomers from manufacture is often high enough for good stability. However, to insure maximum shelf life, the proportions mentioned above (about 0.1 to about 1% by weight of the composition) are recommended. Of those inhibitors which have been found of adequate utility is the group consisting of hydroquinones, benzoquinones, naphthoquinones, phenanthraquinones, anthraquinones, and substituted compounds of any of the foregoing. Additionally, various phenols can be employed as inhibitors, the preferred one being 2,6-di-tert-butyl-4-methyl phenol.

The amount of thickness, viscosity, or thixotropy desired can be varied in accordance with the particular application required. Thickeners, plasticizers, diluents, and various other agents common to the art can be employed in any reasonable manner to produce the desired characteristics.

The invention will be appreciated further from the examples to follow, which are not meant in any way to restrict the effective scope of the invention.

EXAMPLES

Example 1

The table below shows three adhesive formulations, two of which are of instant polyisoprene rubber-containing compositions (1 and 2) and one which does not have the rubber (control 3).

| Ingredient | Formulation No. | | |
|---|---|---|---|
| | 1 | 2 | 3 (control) |
| | Percent by weight | | |
| Cariflex IR-305 (polyisoprene homopolymer) | 25 | 20 | — |
| Methyl Methacrylate | 60.5 | — | 46 |
| Cyclohexyl Methacrylate | — | 65.5 | — |
| Butylene glycol dimethacrylate | 2 | 2 | 2 |
| Methacrylic Acid | 10 | 10 | 10 |
| t-butyl perbenzoate | 2 | 2 | 2 |
| Saccharin | 0.5 | 0.5 | 0.5 |
| Elvacite 2009 (polymethyl-methacrylate) | — | — | 40 |
| *Tensile Strength (psi) | 3579 | 3564 | 4723 |
| **T-Peel Strength (psi) | 26 | 33 | 6.0 |

*Measured according to ASTM D1002-64; tested at room temperature.
**Measured according to ASTM D1876-69; tested at room temperature.

Cariflex IR-305 is an isoprene homopolymer which is a synthetic isoprene and is marketed by Shell Chemicals. Methyl methacrylate and cyclohexyl methacrylate are monofunctional polymerizable methacrylate ester monomers and butylene glycol dimethacrylate is a difunctional polymerizable acrylate ester monomer. Methacrylic acid serves as the adhesion promoter. The initiator system is represented by the perester free-radical initiator, t-butyl perbenzoate, and the accelerator of free-radical polymerization, saccharin. Elvacite 2009 is a trade name for polymethyl methacrylate which was added to the control to increase the viscosity to a satisfactory value.

Steel, grit-blasted laps were coated with the activator Beutene, an amine-aldehyde condensate in trichlorethane marketed by Uniroyal, and the polymerizable part of the adhesive composition (formulations 1, 2, and 3) was applied and the lap shear specimens followed to fully cure at room temperature.

The lap shears were then tested at room temperature for tensile shear and T-peel strengths. As indicated in the table, the T-peel strengths of the instant polyisoprene rubber-toughened compositions are significantly better than the control composition.

Example 2

This example is intended to demonstrate the ability of the instant polyisoprene toughened compositions to withstand high temperatures for substantial periods of time. Formulation 4 in Table II, is representative of the first part of the two-part instant composition and formulation 5 is a control, using the chlorosulphonated polyethylene (Hypalon 20) rubber of the prior art.

TABLE II

| | Formulation No. | |
|---|---|---|
| | 4 | 5 (control) |
| Ingredients | Percent by weight | |
| Krynac 833 (acrylonitrile/isoprene copolymer) | 20 | — |
| Hypalon 20 | — | 35.0 |
| Methyl methacrylate | 65.5 | 48.25 |
| Butylene glycol dimethacrylate | 2.0 | 1.0 |
| Methacrylic acid | 10.0 | 10.0 |
| t-butyl perbenzoate | 2.0 | — |
| Saccharin | 0.5 | — |
| Cumene hydroperoxide | — | 0.5 |
| Epoxy | — | 5.0 |
| Stabilizer | — | 0.25 |

Krynac 823 is a copolymer of acrylonitrile and isoprene and is a preferred rubber in the instant composition. As mentioned above, Hypalon is a chlorosulphonated polyethylene rubber used in the prior art. The polymerizable acrylate ester monomers are methyl methacrylate and butylene glycol dimethacrylate. The initiator system is comprised of the perester free-radical initiator, t-butyl perbenzoate, and the sulfimide accelerator of free radical polymerizable, saccharin. Cumene hydroperoxide is a peroxy free-radical initiator.

Lap shear specimens were prepared as in Example 1, and those specimens using Formulation 4 were primed with amine-aldehyde activator, Bentene and those specimens using Formulation 5 were primed with DuPont 808, an amine-aldehyde activator. Part one of the adhesive compositions (formulations 4 and 5) was applied to the primed laps and allowed to fully cure at room temperature.

The results of the testing are indicated below.

| | Heat aging - tested at room temperature Formulation No. | |
|---|---|---|
| *Tensile Shear (psi) | 4 | 5 |
| initial (room temp.) | 4390 | 4660 |
| after 1 hour at 180° C. | 4202 | 3912 |
| after 6 hrs. at 180° C. | 4695 | 2890 |
| after 24 hrs. at 180° C. | 4680 | 2101 |

*tested according to ASTM D1002-64

The results above demonstrate an improvement in heat resistant properties of the instant compositions (Formulation 4) over those of the prior art (Formulation 5).

We claim:

1. In a two-component adhesive composition of the type having a first component comprising a solution of polymer in at least one polymerizable monomer in combination with an adhesion promoter and a free radical catalyst system, and a second component comprising an activator, an improved composition providing increased high temperature resistance in the cured adhesive wherein: said polymer is present at levels of 20% or more of the total composition and is selected from the class of isoprene block copolymer rubbers having a molecular weight in excess of 5,000; and said monomer is an acrylate ester.

2. The composition of claim 1, wherein the acrylate ester monomer is selected from the class consisting of monofunctional monomers represented by the formula:

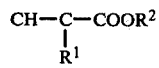

wherein $R^1$ is H, $CH_3$ or lower alkyl; $R^2$ is alkyl, cycloalky, alkylhydroxy, alkylene or tetrahydrofurfuryl.

3. The composition of claim 2, wherein the acrylate ester monomer is selected from the group consisting of methyl methacrylate, cyclohexyl methacrylate, tetrahydrofurfuryl methacrylate, isobornyl methacrylate, hydroxyethyl methacrylate and hydroxypropyl methacrylate.

4. The composition of claim 1, wherein the acrylate ester monomer is a mixture of mono- and poly-functional acrylates and wherein the polyfunctional acrylate is present in amounts of between about 1% and 40% by weight of the total composition.

5. The composition of claim 4, wherein the monofunctional acrylate is selected from the group consisting of methyl methacrylate and cyclohexyl methacrylate and the polyfunctional acrylate is a glycol dimethacrylate.

6. The composition of claim 1, wherein the elastomeric rubber is a block copolymer of isoprene and styrene.

7. The composition of claim 1, wherein the elastomeric rubber is a block copolymer of isoprene and acrylonitrile.

8. The composition of claim 1, wherein the elastomeric rubber is a block copolymer of isoprene and methacrylonitrile.

9. The adhesive composition of claim 1, wherein the activator is an aldehyde-amine condensation product.

10. The adhesive composition of claim 9, wherein the aldehyde-amine condensation product is butyraldehyde-aniline.

11. The adhesive composition of claim 9, wherein the second component consists of a solution of said aldehyde-amine condensation product in an inert solvent.

12. The composition of claim 1, wherein the second component further comprises a free-radical polymerizable component.

13. The adhesive composition of claim 1, wherein the adhesion promoter is selected from the group consisting of acrylic and methacrylic acid.

14. The adhesive composition of claim 1, wherein the adhesion promoter is a silane.

15. The adhesive composition of claim 1, wherein the composition when cured and aged at a temperature of 180° C. for 24 hours shows increased shear strength when compared to the shear strength of the composition when cured at room temperature.

16. A method of bonding a pair of substrates comprising applying a composition comprising: a first component comprising a solution of polymer in at least one polymerizable monomer in combination with an adhesion promoter and a free radical catalyst system, and a second component comprising an activator, said composition being an improved composition providing increased high temperature resistance in the cured adhesive wherein: said polymer is present at levels of 20% or more of the total composition and is selected from the class of isoprene block copolymer rubbers having a molecular weight in excess of 5,000 and said monomer in an acrylate ester, to at least one of the substrates and joining the two substrates for sufficient time to permit the composition to cure.

* * * * *